UNITED STATES PATENT OFFICE.

WILLIAM B. McCLURE, OF ST. PAUL, MINNESOTA.

ARTIFICIAL FUEL.

SPECIFICATION forming part of Letters Patent No. 437,164, dated September 23, 1890.

Application filed March 22, 1890. Serial No. 344,927. (No specimens.)

*To all whom it may concern:*

Be it known that I, WILLIAM B. MCCLURE, of St. Paul, in the county of Ramsey and State of Minnesota, have invented a new and useful Artificial Fuel, of which the following is a full, clear, and exact specification.

My composition is made up of the following ingredients—that is: finely-pulverized culm or coal-dust, sand, finely-pulverized calcined lime-dust, melted solid asphaltum, and asphaltum which is naturally liquid. The proportions in which these ingredients are combined may be more or less varied; but the following description will suffice to explain substantially about the proportions which I have found it best to use, the properties of the different ingredients, and the character of the composition as a whole. Thus, according to a process of producing the compound which I have made the subject of a separate application for patent simultaneously with this, I have taken one (1) ton of culm or coal-dust and finely pulverized the same, and then added to and thoroughly mixed with the same from one hundred to hundred and fifty pounds (100 to 150 lbs.) of sharp clean sand and about one hundred pounds (100 lbs.) of finely-powdered well-burned lime-dust, all in a dry state. To this mass, after the ingredients have been thoroughly mixed together, I have incorporated and thoroughly mixed with said mass, subject to heat, a quantity of fluid asphaltum—say about ten (10) to fifteen (15) per cent. in proportion to the whole mass—and which fluid asphaltum is made up of ordinary or any solid asphaltum melted at about 300° Fahrenheit, having added to it about ten (10) to fifteen (15) per cent. of natural liquid asphaltum—such, for instance, as found in Southern California, Cuba, and Venezuela—and which serves to refine the solid asphaltum by throwing down the abundant earths held in the substance of the solid asphaltum, while the two asphaltums combine well with coal-dust for fuel. After the compound has been thus or equivalently made, the same is subjected, before cooling, to pressure in a press to form it into compact and conveniently-sized blocks, which blocks may afterward be set and cooled by passing them through cold water, and whereby, as compared with drying them in an oven, all the volatile parts of the compound are retained.

In this compound the asphaltum generally serves as a combustible binder of the whole mass, and the burnt or calcined lime-dust forms with the asphaltum a hard cement-like substance, preventing breakage in transportation, is nearly free from smoke, and makes the blocks clean to handle, while the sand in the compound forms an incombustible separator of the particles of coal-dust, so that when using the fuel the fire reaches each atom of coal-dust and the atom goes into flame-like gas with little smoke. The whole compound, in fact, while giving out great heat, forms almost a smokeless fuel.

Having thus described my invention, I claim as new and desire to secure by Letters Patent—

The within-described composition of matter to be used as an artificial fuel, consisting of pulverized culm or coal-dust, sand, pulverized burnt or calcined lime-dust, and solid and naturally liquid asphaltums, substantially as specified.

WILLIAM B. McCLURE.

Witnesses:
   A. GREGORY,
   EDGAR TATE.